UNITED STATES PATENT OFFICE.

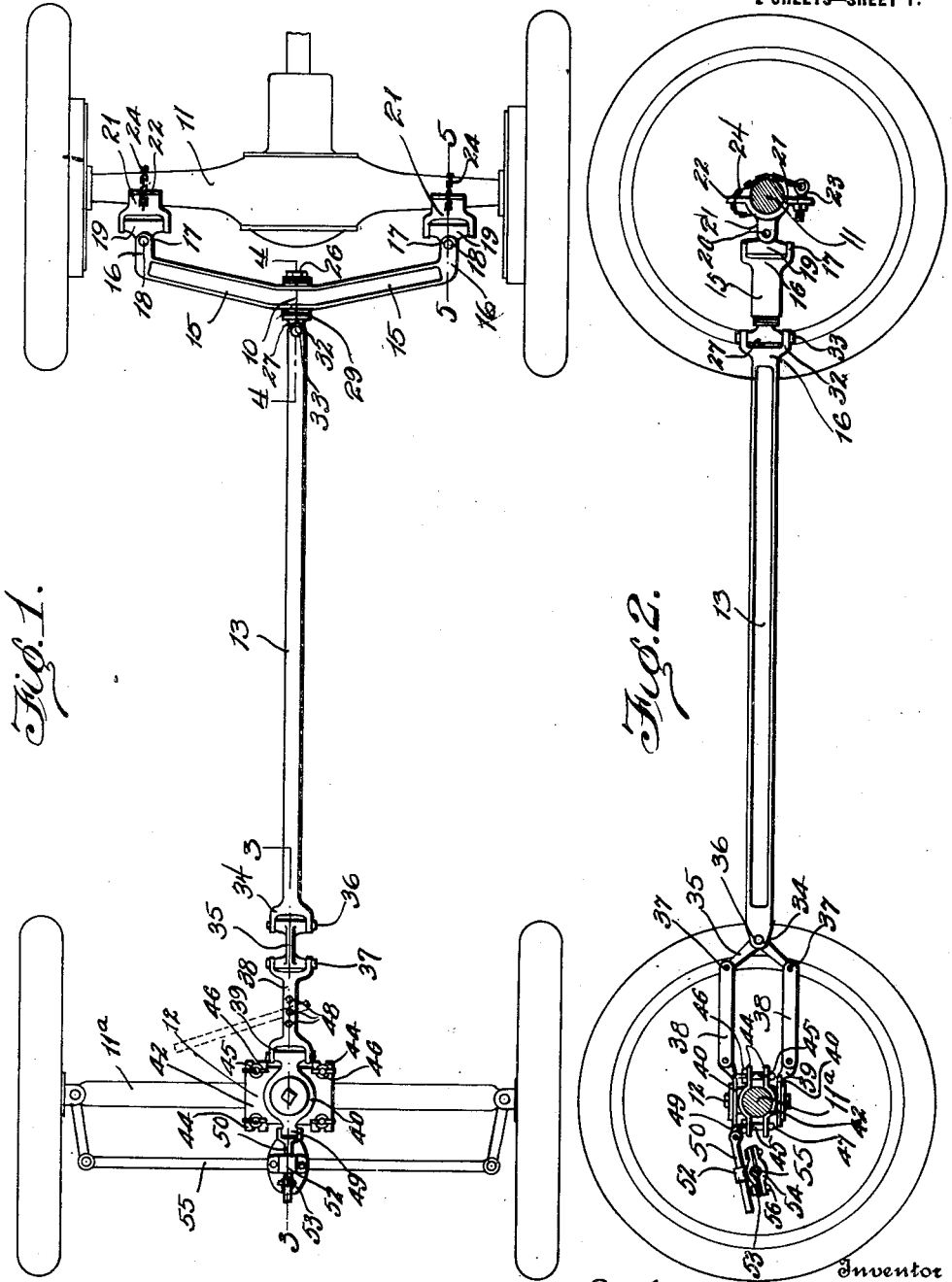

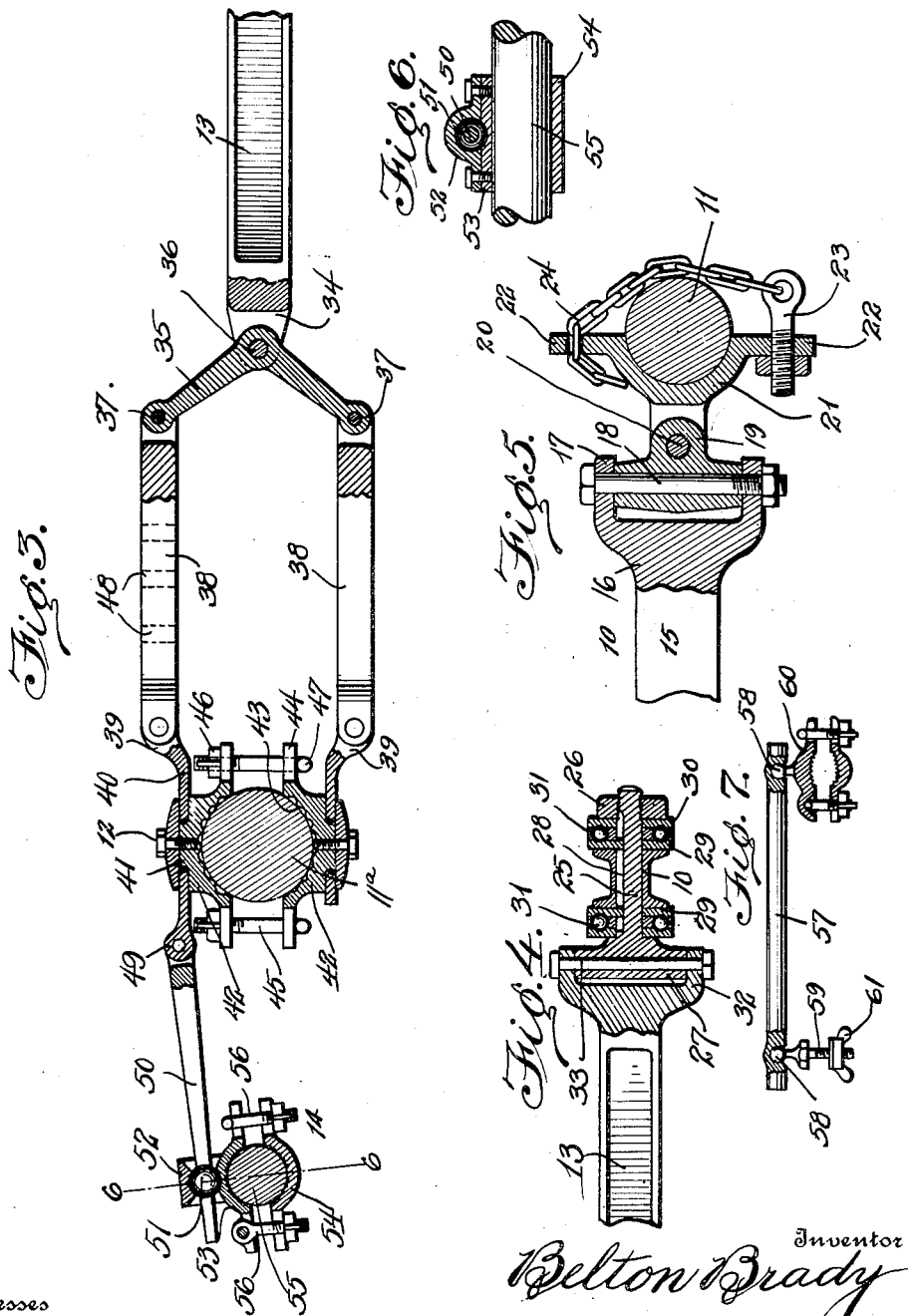

BELTON BRADY, OF ROFF, OKLAHOMA.

AUTOMOBILE-TOWING DEVICE.

1,257,454.  Specification of Letters Patent. Patented Feb. 26, 1918.

Application filed July 20, 1915. Serial No. 40,974.

*To all whom it may concern:*

Be it known that I, BELTON BRADY, a citizen of the United States, residing at Roff, in the county of Pontotoc and State of Oklahoma, have invented certain new and useful Improvements in Automobile-Towing Devices, of which the following is a specification.

This invention relates to an automobile coupling and steering device and contemplates as its principal object the provision of means for linking a pair of automobiles together in such manner that the forward car may readily tow the rear car, which latter will be automatically steered through the coupling connections.

More specifically it is an object of this invention to provide a towing device which shall be capable of connecting adjacent axles of a pair of automobiles for travel in the same direction in such manner that vertical and horizontal play between the axles will be at all times allowed in order to take up the shocks which would be otherwise met through a rigid connection between the vehicles due to inequalities of the road surface and to the different turning radii of the cars.

An equally important object with the foregoing is to equip a towing connection between a pair of automobiles with means clamping the steering rod of the rear automobile in order to automatically steer the latter in accordance with the progress of the leading automobile, provision being made for the use of this device upon automobiles having the steering rod located either forwardly or rearwardly of the front axle.

The above and additional objects which will become apparent as this explanatory description proceeds, are accomplished by such means as are illustrated in the accompanying drawings, described in the following specification and then more particularly pointed out in the claims which are appended hereto and form a part of this application.

With reference to the drawings, wherein there is illustrated the preferred embodiment of this invention as it is reduced to practice, and throughout the several views of which like characters of reference designate similar parts, Figure 1 is a plan view of the towing device of this invention as connecting a pair of automobiles, for travel in the same direction;

Fig. 2 is a sectional view through the axles of the automobiles showing the device in elevation;

Figs. 3, 4 and 5 are respectively enlarged sectional details through various portions of the device taken respectively on the lines 3—3, 4—4 and 5—5 of Fig. 1;

Fig. 6 is a sectional view derived from the plane indicated by the lines 6—6 of Fig. 3, and Fig. 7 is a view, partly in section, of an auxiliary steering rod sometimes used in conjunction with the apparatus of the previous figures.

Broadly, the towing means comprehended by this invention include a forward yoke 10 adapted to be connected to the rear axle 11 of the forward or towing car, rearward means of connection designated 12 as a whole, for attachment upon the forward axle 11ª of the rear or towed machine; a towing beam 13 adapted to connect the elements 10 and 11 and the means designated as an entirety by the numeral 14 for clamping the steering rod of the towed machine in such manner as to automatically control the cars thereof in accordance with the progress of the leading car.

The yoke 10 is, as are the majority of the parts of this invention forged, or cast from a suitable durable metal and includes yoke arms 15 slightly forwardly inclined from the central body portion 10 and having extremities 16 turned partially forward and bifurcated, as shown in Fig. 5, to form ears 17 on each extremity for the vertical connecting bolt 18, the latter forming part of a pair of joints of a well known type, each of which joints is designated in its entirety by the numeral 19 and includes a horizontal pivot bolt 20 which links each extremity 16 of the forward yoke 10 to a clamp portion 21.

These clamps are formed to semicircularly engage the rear axle 11 and are provided with diametrical ears 22 which are respectively apertured and slotted for the reception of an adjustable bolt 23 and a connecting chain 24, which is designed to lap around the opposite half of the axle in forming a readily removable clamping connection between the yoke 10 and the forward car.

The body portion of this forward yoke is apertured to receive a bolt 25, extending along a line coincident with the longitudinal axis of the forward car, such bolt being threaded upon one extremity for the reception of a nut 26 and being enlarged upon the opposite extremity to form a vertical pivoting trunnion 27. The bolt 25 is formed with a central key-way 28 which serves to secure plates 29 thereto. These plates form, in conjunction with similar plates 30 which have no connection with the bolt 25, raceways for antifriction bearings 31 so that the friction of pivotal movement of the yoke 10 about the bolt will be reduced to a minimum.

The towing beam 13 which forms the chief coupling means between the respective car attachments, is formed upon its forward extremity with spaced ears 32 to encompass the trunnion 27 and be pivotally connected thereto by the bolt 33, completing a swivel joint between the beam 13 and yoke 10 through the bolt 25 and a universal joint connection between the axle 11 and the beam 13 by reason of the horizontal pivots 20 and the vertical pivot 33. The rearward extremity of this towing beam is formed with similar ears 34 but in an alinement at right angles to the ears 32. A bell crank link 35 is centrally pivoted as indicated at 36 between the ears 34 and has its arms similarly connected as denoted by the numerals 37 to a pair of horizontal link members 38, the opposite extremities of which form horizontal pivotal connections 39, also of the same character, with pivoting links 40 formed with suitable central apertures for seating upon the projecting pivoting studs 41 of the opposite clamp members 42 of the means previously designated 12 as a whole for connection to the rear axle 11. Ball bearings may be placed as illustrated in Fig. 3 between the links 40 and the pivoting studs of the clamp members.

Each of these clamps 42 is formed with a flat surface upon which a respective pivotal link 40 is adapted to rest, and are interiorly concaved and formed with corrugations 43 adapted to establish a firm grip upon the axle 11ª, which may be of the circular form, in cross section, illustrated or may be of any other desirable construction. Slotted ears 44 extend laterally from each of the clamps 42 and are adapted to be removably connected by bolts 45 threaded at one extremity for the reception of securing nuts 46 and formed at their opposite ends with integral T's 47 adapted to prevent their displacement from the slotted ears.

The upper horizontal link 38 is formed with a plurality of vertical apertures 48 to serve a purpose to be later more fully set forth, while the upper pivotal link 40 has its rearward extremity extended and enlarged to form a pivotal ear 49 for a connecting link 50. This link or rod 50 is adapted to have its free extremity project through a ball 51 which latter is adjustably carried upon the rod 50 in order to serve as a mounting ball which may be received within a socket 52 formed upon a clamp member 53 which, with its counterpart clamp member 54 forms the connections previously designated as a whole by the numeral 14 upon the steering rod 55 of the rear automobile. These clamps 53 and 54 have their clamping surfaces corrugated and may be similarly connected by bolts 56 in the same manner as of the axle clamps 42.

The foregoing sets forth the construction and arrangement of the towing means which are provided by this invention for the coupling of a disabled automobile with the towing car, the towed machine being of that type illustrated in Fig. 1, as having the steering rod 55 arranged behind the front axle 11ª. Many machines, however, have their steering rods positioned before their front axle, which accordingly, necessitates the employment, by this invention, of the auxiliary connecting rod illustrated in Fig. 7, in place of the rod 50 and its adjuncts. The auxiliary connecting rod 57 is formed at opposite extremities with suitable sockets for the reception of the universal joint balls 58, one of the balls having formed or connected therewith a bolt 59 and the other of the balls supporting a clamp 60 of the same nature as of the clamp 14 and having its inner surface similarly corrugated to contact with the steering rod of the vehicle. To position the connecting rod 57 upon the towing device, the bolt 59 is inserted through one of the apertures 48 of the uppermost link 38 and is maintained therein by the use of the removable wing nuts 61 occupying some such position as is illustrated in the dotted lines of Fig. 1.

Considering that the towing device of this invention is assembled in the manner clearly set forth in Figs. 1 and 2, it will be seen that the forward car is so coupled to the car to be towed, by the employment of universal joints between the yoke 10 and the axle 11 and between the yoke and towing beam 13 in addition to the various pivotal connections illustrated in Fig. 3, that a material amount of play is provided for absorbing all the shocks due to varying road surfaces as traveled by the coupled cars which would otherwise be transmitted to the rear car if a rigid coupling connection were used, or one not employing the universal connections described. On a turn, however, this freedom of motion between the cars in no way affects the automatic steering of the rear car. Considering that the towing automobile is rounding a curve it will readily be seen that no direct thrust will be imparted through the towing beam 13 upon the steering rod connections of the rear car, owing to the pivotal connections mentioned. The towing beam, however, will be displaced from its axial alinement with both cars in the obvious manner, which will, accordingly, cause the pivotal plates 40 to swivel upon the studs 41 as a center, as the various connections 34, 37 and 39 between these plates and the towing beam do not permit freedom of lateral motion. As these plates swivel upon the clamps 42 as a pivot motion of rotation will be imparted to the link 50 which will, accordingly, cause lateral movement of the steering rod 55 and consequently change the course of the following car automatically in accordance with that taken by the towed automobile. If the link 57 is employed in place of the link 50 the result will be exactly the same owing to the fact that it operates upon the opposite side of the pivotal axis afforded by these studs 41. If the car that is to be towed is provided with the worm and sector type of steering gear, it is obvious that the steering rod of the car can be removed before applying the device.

While in the foregoing, however, there has thus been illustrated in the drawings and described in the specification, such combination and arrangement of elements as constitute the preferred embodiment of this invention, it is desired to emphasize the fact that such minor changes in the matters of proportion and degree may be made in later adaptations of this device as shall not alter the spirit of the invention as defined in the appended claims.

What is claimed is:—

1. A towing and steering device for coupled vehicles including an axle clamp to be secured near each end of the rear axle of the leading vehicle, an axle clamp for the following vehicle, a yoke connected at its ends to the first of said clamps by horizontal pivots, a beam having vertical and swivel connections to the yoke, plates pivoted upon the second of said clamps, horizontal pivot connections between the plates and the beam, a link pivotally connected to one of said plates, and clamps universally supported by said link and disposed to control the steering wheels of the following vehicle.

2. A towing device for coupled vehicles comprising a beam adapted to be connected to the leading vehicle, a clamp for rigid connection to the forward axle of the following vehicle, coupling plates pivoted on the upper and lower sides of said clamp to swing in horizontal planes, a bell crank lever centrally pivoted to the rear end of the beam to swing in a vertical plane, and links pivoted to said coupling plates and to the ends of the bell crank lever by horizontal pivots.

3. A towing device for coupled vehicles comprising a beam, a swiveled connection between said beam and the leading vehicle to prevent torsional stresses on said beam, a clamp for rigid connection to the forward axle of the following vehicle, and a coupling plate pivoted intermediate its ends to said clamp to swing in a horizontal plane, a link pivoted to one end of said coupling plate and to the beam by horizontal pivots, and a pivotal member on the opposite end of said plate to connect with means for steering the following vehicle.

In testimony whereof I affix my signature in presence of two witnesses.

BELTON BRADY.

Witnesses:
 CHAS. P. BEAUCHAMP,
 MYRTLE BEAUCHAMP.